Figure 3:
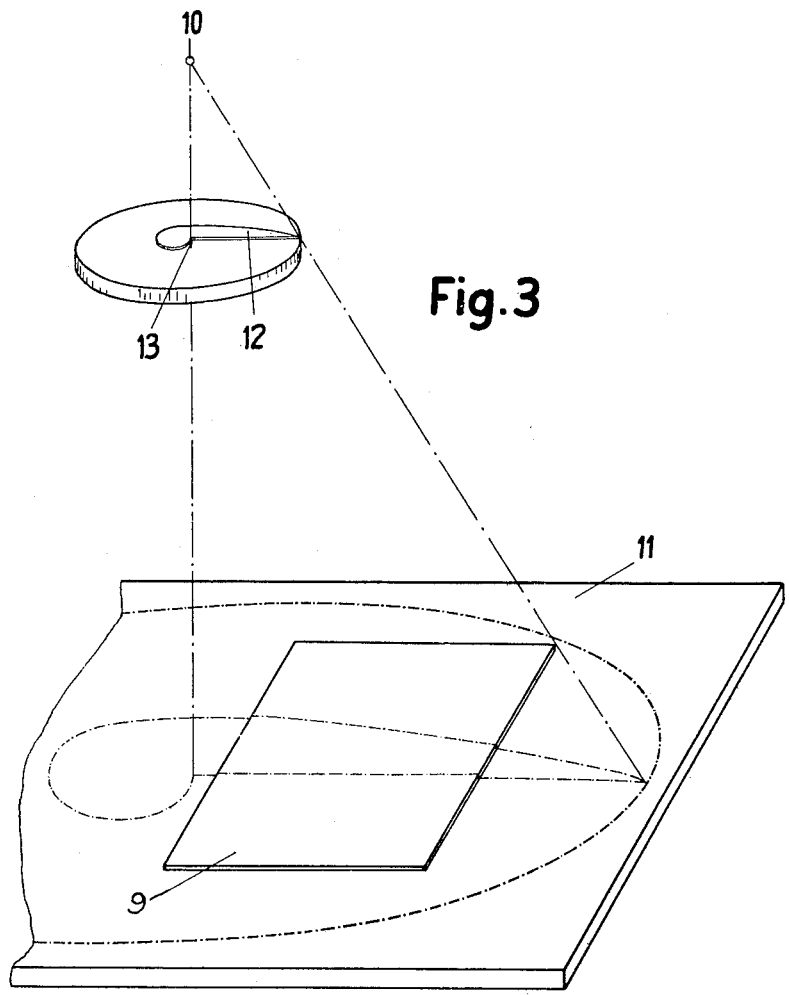

Sept. 13, 1955     W. ENGELER     2,717,545
ILLUMINATING DEVICE
Filed Aug. 26, 1952     2 Sheets-Sheet 1
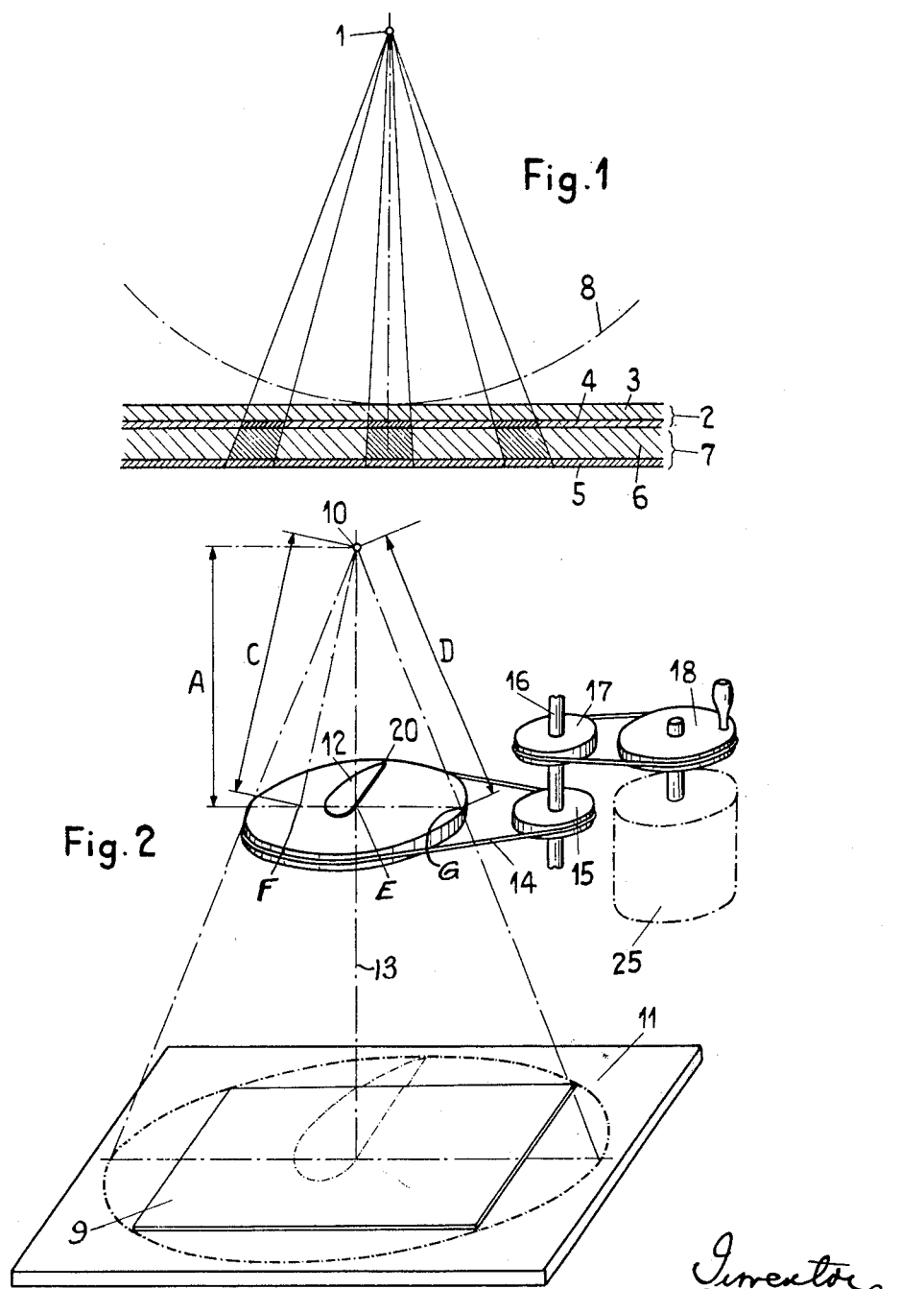

Sept. 13, 1955 W. ENGELER 2,717,545
ILLUMINATING DEVICE

Filed Aug. 26, 1952 2 Sheets-Sheet 2

Inventor
Walter Engeler
By Singer, Stern & Carlberg
attys.

United States Patent Office 2,717,545
Patented Sept. 13, 1955

2,717,545

ILLUMINATING DEVICE

Walter Engeler, Affoltern am Albis, Zurich, Switzerland

Application August 26, 1952, Serial No. 306,326

Claims priority, application Switzerland August 27, 1951

3 Claims. (Cl. 95—73)

The present invention relates to an illuminating device as used e. g. for copying devices for the production of line- grid- and half tone copies on chromate layers or copying lacquers in the manufacture of clichés, in the making of offset- and of intaglio-prints. It can be used for all sorts of rays, which are emitted from a point shaped source (heat rays, radium rays, etc.)

It is well known that it is very desirable to use in copying devices a point-shaped source of light i. e. as small and as powerful a source of light as possible which radiates its light uniformly on to a plane surface. The light of an arc lamp burning openly and without a reflector comes nearest to the ideal solution. These conditions will now be explained with reference to the accompanying drawing in which:

Fig. 1 is a grossly exaggerated diagram of the path of light under a grid- or line-negative, Fig. 2 is a perspective diagrammatic view of an embodiment of the invention, and Fig. 3 is a perspective diagram of the path of light in the embodiment according to Fig. 2.

Referring first to Fig. 1, 1 is a point-shaped source of light, 2 a negative consisting of a carrier 3 and the layer 4 of a photographic silver-halide emulsion, the copying plate is denoted 5 and the copy is denoted 7 and has a light-sensitive layer 6. As well known, faultless, clear copies can thus be obtained. However, as indicated by the chain-dotted arc 8, a uniform illumination would be attained on a part-spherical face only, where as a plane face can never be uniformly illuminated, and the larger the area, the bigger the differences in illumination unless the source of light is very far away, which would involve on the other hand the use of much stronger sources of light and accordingly much higher first costs and operating costs of the plant.

It has been attempted to obviate this unequal illumination by the use of so called area light sources. With the latter it was possible to attain a substantially uniform illumination, but the disadvantage arose that grid- or line-copies were less true to the negative and less sharp. The full shades proper under the points of the grid or under the covered spots of the negative turn out to be smaller and to be surrounded by penumbrae.

The invention has the main object of combining the advantages of the two sorts of light sources mentioned hereinabove, without having to put up with their disadvantages. According to a main feature of the invention this is achieved thereby that between the source of light and the projection screen a rotatably arranged system of blinds is provided the shape of which is such that it does not cover up practically any rays at the outer circumference, but screens off any amount of radiation exceeding the luminosity prevailing at the margins of the projection screen progressively towards its axis of rotation which passes preferably through the source of light.

These and other objects and features of the invention will become clear from the following description of an embodiment of the invention given by way of example with reference to Figs. 2 and 3, and while I am describing a typical and advantageous embodiment of my said invention, I wish it to be understood that this embodiment is illustrated in a purely diagrammatical way and that various ways of detail construction of a suitable device, modifying this diagrammatic embodiment, will occur to a person skilled in the art.

Referring now to Figs. 2 and 3, the device according to the invention comprises a source of light 10 and a protection screen 11 on which the sheets 9, namely one or more copying plates to be exposed and the negatives to be copied, are laid out. In order to obviate an unhomogeneous illumination, between the source of light 10 and the screen 11 a blind 12 is provided which rotates about an axis 13. In the present embodiment this blind 12 is driven by a cord or belt 14 which runs over a pulley 15 which in turn is driven through an axle 16, a pulley 17 and a hand-driven crank disc 18. The axle 13 is preferably coaxial to the axis connecting the light source 10 with the center of the sheets 9.

Obviously this arrangement is purely diagrammatic, and alternatively a motor 25 could be provided which sets the blind 12 directly or indirectly in rotation at a speed of say 12 revolutions per minute or more.

The size of the blind 12 is such that the cone enveloping the same, having its apex in the source of light 10, scans at least approximately the whole area of the sheets 9, as diagrammatically indicated in Figs. 2 and 3. The shape of the blind is such that it runs out into a point or cusp 20 at its outer end which contacts the mantle of the aforesaid cone. When the blind rotates, a minimum of light, or practically no light at all is covered up at the point 20. Without a blind, the intensity of light would be strongest in the center of the sheets 9. However, by means of the blind the excess of light over the luminosity prevailing at the periphery of the sheets 9 is screened off. The shape of the blind is accordingly such that light is progressively screened off more and more towards the axle 13, and accordingly towards the center of the sheets 9. With given dimensions the boundary curve of the blind can be calculated according to the formula:

$$\frac{\left(\frac{C}{A}\right)^2}{\left(\frac{D}{A}\right)^2} = \left(\frac{\text{inner hypothenuse}}{\text{vertical side}}\right)^2 \bigg/ \left(\frac{\text{outer hypothenuse}}{\text{vertical side}}\right)^2 = \begin{cases} \text{Illumination required at a distance} \\ \text{C from the point-shaped source of} \\ \text{light in percent of the illumination} \\ \text{at a distance D from said source of} \\ \text{light} \end{cases}$$

In this formula, the triangles 10–F–E and 10–G–E in Fig. 2 are compared. The hypothenuse 10–F in the first-mentioned triangle is called the "inner hypothenuse," and the hypothenuse 10–G in the last-mentioned triangle is called the "outer hypothenuse." The "vertical side" is the side 10–E, common to both triangles.

Obviously, when using one single source of light this difference in illumination may be achieved by allowing light to pass a point closer to the axis 13, such as the point F, during a proportionately shorter period of time than a more distant point, such as G. This, in turn, may be accomplished by admitting the light past the point F during a proportionately smaller portion of the angular movement of the blind.

For example, if light is admitted past the peripheral point G during a 360° rotation of the blind 12, light from the same point-shaped source of light 10 should be permitted to pass the point F only during a portion of said rotation. Assume, for example, that $C=8.5$ and $D=9.0$ units of length (which approximately corresponds to the actual proportions in Fig. 2). Then $$\frac{\left(\frac{C}{A}\right)^2}{\left(\frac{D}{A}\right)^2} = \frac{C^2}{D^2} = \left(\frac{8.5}{9.0}\right)^2 = 0.892$$

Accordingly, the size of the rotational angle, during which the light should be permitted to pass the point F is $=0.892\times360°=$ approximately 321°. Consequently, at the distance FE from the axis 13 the blind 12 should cover an angular distance of $360°-321°=39°$. Obviously, by plotting the corresponding angular distance at a plurality of points between E and G, the required shape and size of the blind 12 is obtained.

The structural embodiment of the blind 12 can be obviously modified a great deal. It may for example consist of an opaque piece of metal, artificial material etc. and may be rotatably mounted on the axle 13, or alternatively on a circular disc of transparent material a blind of the kind illustrated consisting of opaque material such a paint, tin foil or the like may be arranged.

The axis of rotation 13 of the blind need not necessarily coincide with the axis connecting the source of light with the center of the sheets 9, it may run obliquely to the latter, if desired (Fig. 3), and the axles 13 and the aforesaid axis need not pass through the sheets 9.

Measurements made in practice tests have proved that with the device according to the invention a substantially uniform illumination can be attained.

What I claim as my invention and desire to secure by Letters Patent, is:

1. An illuminating device comprising in combination: a point-shaped source of light, a plane projection screen, a blind system rotatably arranged between the said source of light and the said projection screen, the said blind tapering off towards the periphery so as to screen off an amount of light diminishing to a minimum towards the periphery while screening off the excess of light beyond the luminosity prevailing at the periphery gradually towards the axis of rotation.

2. A device as claimed in claim 1 wherein the axis of rotation of the said blind coincides with the axis connecting the said point-shaped source of light with the center of the said projection screen.

3. A device as claimed in claim 1 wherein the axis of rotation of the said blind is arranged obliquely with respect to the axis connecting the said point-shaped source of light with the center of the said projection screen.

References Cited in the file of this patent

UNITED STATES PATENTS

| | | |
|---|---|---|
| 778,938 | Wyman | Jan. 3, 1905 |
| 1,051,567 | Dreyfoos | Jan. 28, 1913 |
| 1,336,989 | Stanley | Apr. 13, 1920 |
| 2,204,297 | Brunk | June 11, 1940 |
| 2,459,362 | Cary | Jan. 18, 1949 |
| 2,571,697 | Evans | Oct 16, 1951 |

FOREIGN PATENTS

| | | |
|---|---|---|
| 164,452 | Austria | Nov. 10, 1949 |